(12) United States Patent
Panec et al.

(10) Patent No.: US 7,590,701 B2
(45) Date of Patent: Sep. 15, 2009

(54) APPARATUS AND METHOD FOR GENERATING ALERT MESSAGES IN A MESSAGE EXCHANGE NETWORK

(75) Inventors: Peter A. Panec, Santa Monica, CA (US); Jason Brant Douglas, San Francisco, CA (US)

(73) Assignee: Salesforce.com, Inc., San Francisco, CA (US)

( * ) Notice: Subject to any disclaimer, the term of this patent is extended or adjusted under 35 U.S.C. 154(b) by 779 days.

(21) Appl. No.: 10/618,089

(22) Filed: Jul. 11, 2003

(65) Prior Publication Data

US 2005/0246424 A1    Nov. 3, 2005

(51) Int. Cl.
   *G06F 15/16* (2006.01)
(52) U.S. Cl. .................. 709/207; 709/206; 709/223; 709/224; 714/43; 714/47; 714/48
(58) Field of Classification Search .......... 709/206, 709/207, 223, 224
   See application file for complete search history.

(56) References Cited

U.S. PATENT DOCUMENTS

| 5,850,518 | A |   | 12/1998 | Northrup | 395/200.33 |
| 6,021,262 | A | * | 2/2000  | Cote et al. | 709/223 |
| 6,105,027 | A |   | 8/2000  | Schneider et al. | |
| 6,138,158 | A |   | 10/2000 | Boyle et al. | |
| 6,178,505 | B1 |  | 1/2001  | Schneider et al. | |
| 6,397,254 | B1 |  | 5/2002  | Northrup | 709/227 |
| 6,408,336 | B1 |  | 6/2002  | Schneider et al. | |
| 6,421,705 | B1 |  | 7/2002  | Northrup | 709/203 |
| 6,546,413 | B1 |  | 4/2003  | Northrup | 709/200 |
| 6,618,749 | B1 | * | 9/2003 | Saito et al. | 709/207 |
| 6,671,713 | B2 |  | 12/2003 | Northrup | 709/203 |
| 6,671,746 | B1 |  | 12/2003 | Northrup | 712/200 |
| 6,832,243 | B1 | * | 12/2004 | Mikalsen et al. | 709/206 |
| 6,854,007 | B1 | * | 2/2005 | Hammond | 709/206 |
| 7,284,160 | B2 | * | 10/2007 | Skog et al. | 714/43 |
| 7,296,057 | B2 | * | 11/2007 | Vincent | 709/206 |
| 2002/0019848 | A1 | * | 2/2002 | Sugawara et al. | 709/206 |
| 2003/0018808 | A1 |   | 1/2003 | Brouk et al. | |
| 2003/0041178 | A1 |   | 2/2003 | Brouk et al. | |
| 2003/0053459 | A1 |   | 3/2003 | Brouk et al. | |
| 2005/0239442 | A1 | * | 10/2005 | Chen et al. | 455/412.2 |

* cited by examiner

*Primary Examiner*—Ramy M Osman
(74) *Attorney, Agent, or Firm*—Weaver Austin Villeneuve & Sampson LLP (57) ABSTRACT

A method of operating a message exchange network is described. In one embodiment, the method includes coordinating a message generated by a message sender with a message recipient. The method also includes detecting an event asssociated with the message. The method further includes generating an alert message in response to detecting the event and transmitting the alert message to the message recipient.

28 Claims, 4 Drawing Sheets

APPARATUS AND METHOD FOR GENERATING ALERT MESSAGES IN A MESSAGE EXCHANGE NETWORK

BRIEF DESCRIPTION OF THE INVENTION

The invention relates generally to a message exchange network. More particularly, the invention relates to generating alert messages in a message exchange network.

BACKGROUND OF THE INVENTION

With the emergence of the Internet, organizations are identifying opportunities to extend their core business or cut costs using the Internet. This trend has put increasing priority on integrating disparate application programs within a single organization as well as within different organizations. For this reason, enterprise application integration has become increasingly important to allow organizations to build bridges between various application programs.

Web services have emerged as key solutions for enterprise application integration. Existing Web services can facilitate exchange of data between various organizations. In some instances, existing Web services can detect error conditions during processing of data and can notify an organization of such error conditions. However, existing Web services typically only notify owners of the Web service, while organizations that use the Web service are not notified. Accordingly, organizations that use the Web service may be unaware of error conditions that can adversely impact their business. In addition, existing Web services sometimes fail to identify a processing stage at which an error condition occurs. Thus, an organization that is notified of the error condition may have difficulty pinpointing the source of the problem.

It is against this background that a need arose to develop the apparatus and method described herein.

SUMMARY OF THE INVENTION

In one innovative aspect, the invention relates to a computer-readable medium. In one embodiment, the computer-readable medium includes instructions to detect an error condition during messaging between a message sender and a message recipient. The computer-readable medium also includes instructions to coordinate the error condition with a stage of the messaging. The computer-readable medium further includes instructions to generate an alert message indicating the error condition and the stage of the messaging and instructions to transmit the alert message to at least one of the message sender and the message recipient.

In another embodiment, the computer-readable medium includes instructions to define a set of event categories. Each event category of the set of event categories is associated with a different stage of messaging between a message sender and a message recipient. The set of event categories includes a first event category associated with a first stage of the messaging. The computer-readable medium also includes instructions to detect a first event during the first stage of the messaging and instructions to coordinate the first event with the first event category. The computer-readable medium further includes instructions to generate an alert message indicating the first event and the first event category.

In another innovative aspect, the invention relates to a method of operating a message exchange network. In one embodiment, the method includes coordinating a message generated by a message sender with a message recipient. The method also includes detecting an event associated with the message. The method further includes generating an alert message in response to detecting the event and transmitting the alert message to the message recipient.

BRIEF DESCRIPTION OF THE DRAWINGS

For a better understanding of the nature and objects of some embodiments of the invention, reference should be made to the following detailed description taken in conjunction with the accompanying drawings, in which.

DETAILED DESCRIPTION

Figure 1:
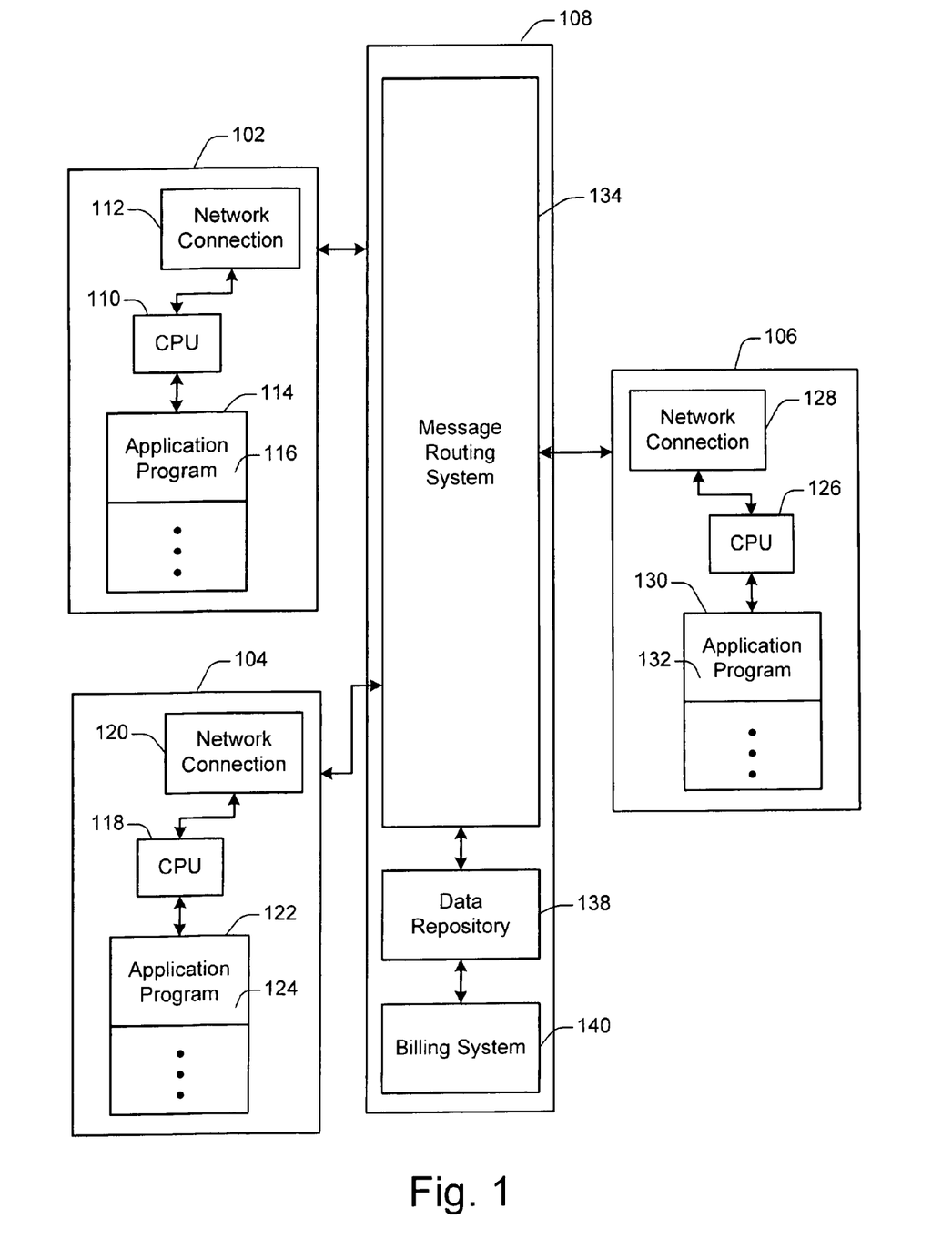
FIG. 1 illustrates a computer network that can be operated in accordance with an embodiment of the invention.

FIG. 1 illustrates a computer network 100 that can be operated in accordance with an embodiment of the invention. In the illustrated embodiment, the computer network 100 includes a number of computers, including computer 102, computer 104, and computer 106. Each of the computers 102, 104, and 106 are connected to a message exchange network 108 using any wire or wireless transmission channel.

The computer 102 can be a client computer, including conventional client computer components, or a server computer, including conventional server computer components. As illustrated in FIG. 1, the computer 102 includes a Central Processing Unit ("CPU") 110 that is connected to a network connection device 112, and a memory 114. The memory 114 stores a number of computer programs, including an application program 116. The application program 116 can be any desktop or enterprise application program. In the illustrated embodiment, the application program 116 is configured to establish conventional network communications with the message exchange network 108 via the network connection device 112. In some instances, the memory 114 can also include a conventional communication program (not shown in FIG. 1) to coordinate network communications between the application program 116 and the message exchange network 108.

The computers 104 and 106 have configurations that are similar to that of the computer 102. As illustrated in FIG. 1, the computer 104 includes a CPU 118 that is connected to a network connection device 120, and a memory 122, which stores an application program 124. Similarly, the computer 106 includes a CPU 126 that is connected to a network connection device 128, and a memory 130, which stores an application program 132.

The computers 102, 104, and 106 can be operated by various organizations, such as, for example, commercial organizations, governmental units, or educational organizations. The message exchange network 108 coordinates exchange of data between the organizations. As further described below, the message exchange network 108 coordinates exchange of data between applications programs of the organizations, such as, for example, the application programs 116, 124, and 132. Data exchanged between the applications programs 116, 124, and 132 can be incorporated in messages that are routed using the message exchange network 108. The organizations can have different application environments, and the message exchange network 108 provides an open platform to facilitate enterprise application integration. Advantageously, this open platform can overlay a public network, such as, for example, the Internet, thus allowing the organizations to avoid heavy investment in specialized hardware and software.

By facilitating communication between application programs, the message exchange network 108 allows organizations to access application programs operated by other organizations that are connected to the message exchange network 108. For example, the message exchange network 108 can facilitate access to applications programs operated by an application service provider. In some instances, one or more of the application programs 116, 124, and 132 can process messages that are in-transit from a message sender to a message recipient. Such in-transit message processing can perform a number of functions, such as, for example, data transformation, data enrichment, data cross-referencing or mapping, message filtering, and credit scoring.

In some instances, an application that is connected to the message exchange network 108 can be referred to as a service. Thus, the application programs 116, 124, and 132 can correspond to different services. Each service can be operated by a particular organization, and an organization can have a number of services connected to the message exchange network 108. Thus, the message exchange network 108 can coordinate exchange of messages between various services.

As illustrated in FIG. 1, the message exchange network 108 includes a message routing system 134, a data repository 138, and a billing system 140. The message routing system 134 operates to receive messages from the application programs 116, 124, and 132, route messages within the message exchange network 108, and deliver messages to the application programs 116, 124, and 132. The message routing system 134 can process a number of messages generated by the application programs 116, 124, and 132. In addition, in response to particular events, the message routing system 134 can generate a number of messages, including alert messages. Alert messages can serve to indicate events that can occur during processing of messages generated by the application programs 116, 124, and 132. The function and implementation of alert messages are further discussed below. The message routing system 134 can be implemented using, for example, one or more conventional routers.

The data repository 138 operates to store a variety of information, such as, for example, profiles of organizations and their application programs as well as message logs. Information stored in the data repository 138 can be referenced by the message routing system 134 in connection with processing of messages. Also, the message routing system 134 can generate message logs in connection with processing of messages. The data repository 138 can be implemented using, for example, one or more conventional databases.

The billing system 140 operates to generate payment information for organizations having application programs connected to the message exchange network 108. The billing system 140 can reference message logs stored in the data repository 138 to identify the extent of usage of the message exchange network 108 and can generate invoices based on the extent of usage. For example, the billing system 140 can charge an organization on a per transaction basis or based on the size of messages processed for the organization.

The foregoing discussion provides a general overview of an embodiment of the invention. Attention now turns to FIG. 2, which illustrates a flow chart for operating a message exchange network (e.g., the message exchange network 108) in accordance with an embodiment of the invention.

Figure 2:
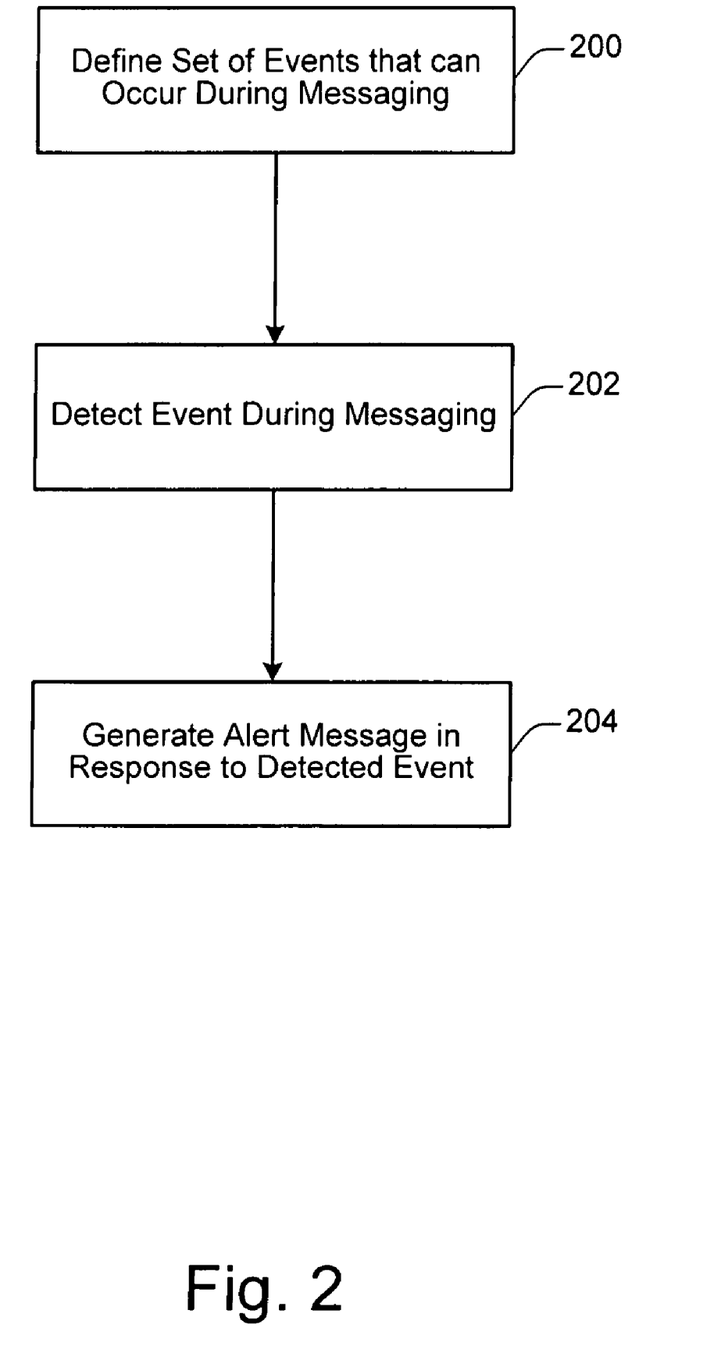
FIG. 2 illustrates a flow chart for operating a message exchange network in accordance with an embodiment of the invention.

The first processing operation illustrated in FIG. 2 is to define a set of events (block 200). In the illustrated embodiment, a message routing system (e.g., the message routing system 134) defines the set of events, and each event can correspond to a particular condition to be monitored during processing of messages in the message routing system. For example, an event can correspond to an error condition in connection with processing a message sent from a message sender (e.g., the application program 116) to a message recipient (e.g., the application program 124). An event can also correspond to a normal condition, such as, for example, a condition associated with attributes of a message or attributes of communication protocols used to process the message.

In the illustrated embodiment, the message routing system associates events having one or more similar characteristics with a particular event category. Messages exchanged between a message sender and a message recipient can be grouped into one or more calls or messagings. Messaging can be one-way messaging in which the message sender sends a notification message for which a response message is not expected from the message recipient. Alternatively, messaging can be two-way messaging in which the message sender sends a request message for which a response message is expected from the message recipient. In the illustrated embodiment, the message routing system defines a set of event categories to group events that can occur at different stages of messaging. In particular, the message routing system can define event categories to group events associated with posting of a message, routing of a message, delivery of a message, and response to a delivered message. In some instances, a group of related messagings can be referred to as a session, and the message routing system can define a set of event categories to group events that can occur at different stages of a session.

Events associated with posting of a message can correspond to conditions associated with posting of a request message or a notification message by a message sender, such as, for example, posting errors due to invalid message headers, message size violations, and so forth. Events associated with routing of a message can correspond to conditions associated with routing of a request message or a notification message to a message recipient, such as, for example, routing errors due to permissions violations, policy enforcement, validity of the message recipient, and so forth. Events associated with delivery of a message can correspond to conditions associated with delivery of a request message or a notification message to a message recipient, such as, for example, delivery errors due to failure to connect to the message recipient, security violations, and message expiration. Events associated with response to a delivered message can correspond to, for example, a timeout error where the message recipient fails to respond to a request message within a particular time interval or a message error where the message recipient sends a response message indicating a processing error.

The second processing operation illustrated in FIG. 2 is to detect an event during messaging (block 202). In the illustrated embodiment, the message routing system detects an event that occurs during a particular stage of messaging between a message sender and a message recipient. Thus, for example, the message routing system can detect one or more events associated with posting of a request message by the message sender, routing of the request message to the message recipient, delivery of the request message to the message recipient, or response to the delivered request message by the message recipient. In some instances, the message routing system can detect events that are relevant not just to a current messaging but also to related messagings in a session. In such instances, the session can involve message senders or message recipients in addition to those participating in the current messaging. For example, the session can involve one messaging between the message sender and the message recipient as well as another messaging between the message sender and a different message recipient. As another example, the session can involve one messaging between the message sender and the message recipient, which can then act as a message sender in connection with another messaging with a different message recipient.

The third processing operation illustrated in FIG. 2 is to generate an alert message in response to the detected event (block 204). In the illustrated embodiment, the message routing system generates the alert message, which can serve to notify a user of the detected event. To facilitate troubleshooting, the alert message can indicate the detected event as well as an event category associated with the detected event. Thus, for example, the alert message can indicate that an error condition occurred during posting of a request message rather than during delivery of the request message. The alert message can also indicate a time associated with the detected event and correlation information associated with the detected event, such as, for example, messaging and session identifiers of a message that triggered the event. In some instances, the message routing system can detect a number of events during messaging. In such instances, the message routing system can generate a single alert message or multiple alert messages, such as, for example, an alert message for each detected event.

Advantageously, the message routing system can transmit the alert message to either of, or both, the message sender and message recipient. Accordingly, the message recipient can be notified of the detected event without having participated in the messaging. Thus, for example, the intended message recipient can be notified of the detected event even if a request message or a notification message is aborted while being sent to the message recipient. Such configuration is useful, for example, in connection with providing customer support. In this case, an organization can be alerted to difficulties its customers are experiencing in sending messages to the organization, and the organization can respond appropriately. Advantageously, the message routing system can transmit alert messages to designated monitoring application programs in addition to, or as an alternative to, transmitting alert messages to the message sender or the message recipient. In this case, the alert message can also indicate the message sender or the message recipient.

Figure 3:
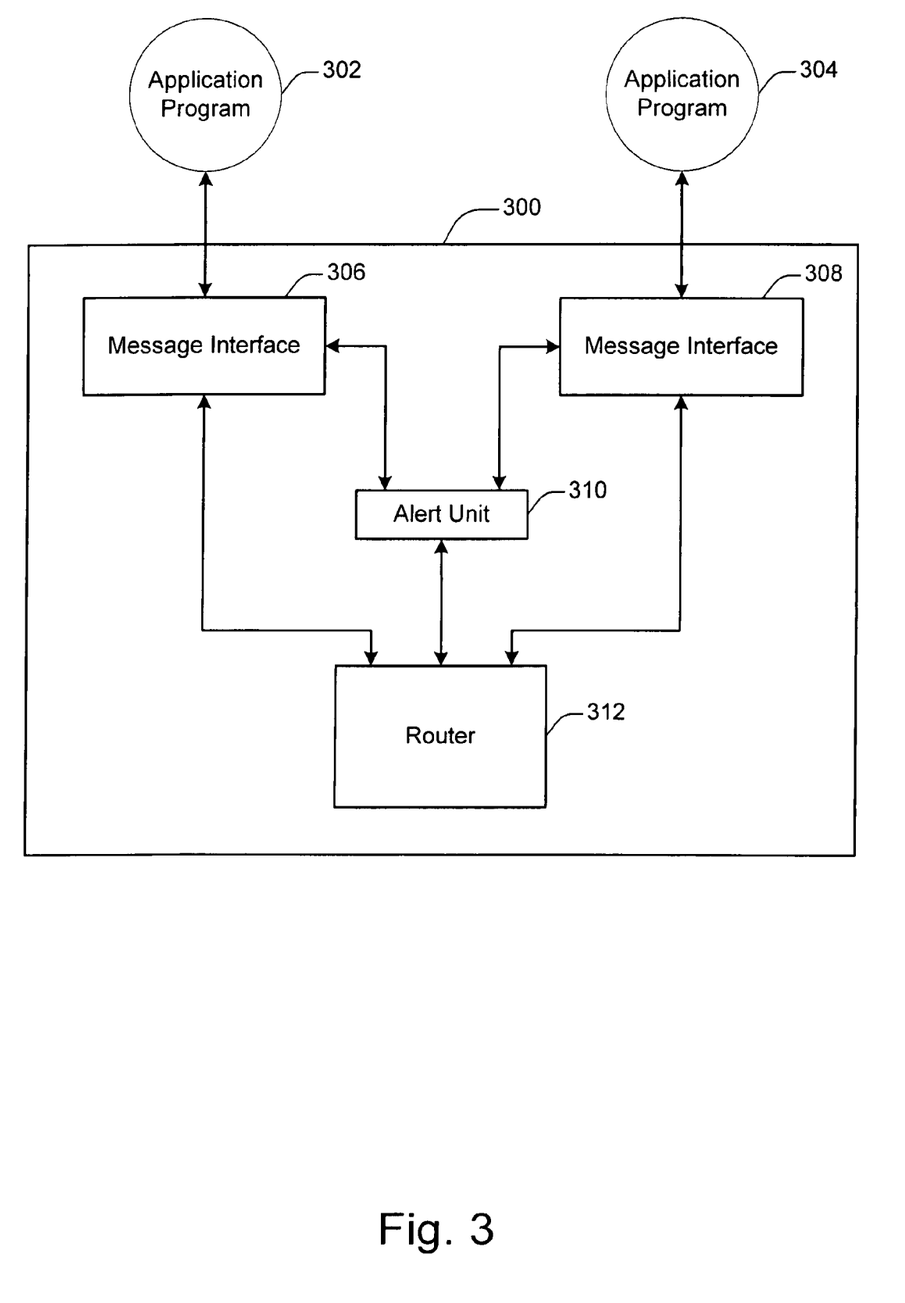
FIG. 3 illustrates various components of a message routing system in accordance with an embodiment of the invention.

Attention next turns to FIG. 3, which illustrates various components of a message routing system 300 in accordance with an embodiment of the invention. As illustrated in FIG. 3, an application program 302 and an application program 304 are connected to the message routing system 300. In the illustrated embodiment, the application program 302 is operated by a first organization, and the application program 304 is operated by a second organization. The first organization and the second organization can be, for example, unaffiliated commercial organizations. The first organization would like to send a purchase order to the second organization. Upon receiving the purchase order, the second organization would like to send a purchase order confirmation to the first organization. The message routing system 300 coordinates exchange of messages between the application programs 302 and 304 to facilitate this transaction. In particular, the message routing system 300 can act as a neutral and trusted third party to this transaction. In the illustrated embodiment, the message routing system 300 includes a message interface 306, a message interface 308, an alert unit 310, and a router 312.

Initially, the application program 302 generates a request message to specify the purchase order. After the request message is generated, the application program 302 attempts to post the request message to the message routing system 300. In particular, the application program 302 attempts to post the request message to the message interface 306. The alert unit 310 operates to detect events associated with posting of the request message. If an event is detected, posting of the request message can sometimes be aborted, and the alert unit 310 can send an alert message to either of, or both, the application programs 302 and 304.

If the request message is successfully posted, the router 312 attempts to route the request message to the application program 304. The alert unit 310 operates to detect events associated with routing of the request message. If an event is detected, routing of the request message can sometimes be aborted, and the alert unit 310 can send an alert message to either of, or both, the application programs 302 and 304.

If the request message is successfully routed, the router 312 attempts to deliver the request message to the application program 304. In particular, the router 312 attempts to deliver the request message to the application program 304 via the message interface 308. The alert unit 310 operates to detect events associated with delivery of the request message. If an event is detected, delivery of the request message can sometimes be aborted, and the alert unit 310 can send an alert message to either of, or both, the application programs 302 and 304.

If the request message is successfully delivered, the alert unit 310 operates to detect events associated with response by the application program 304 to the delivered request message, including, for example, a timeout error. If an event is detected, the alert unit 310 can send an alert message to either of, or both, the application programs 302 and 304. In response to the delivered request message, the application program 304 can generate a response message to specify confirmation of the purchase order, which response message can be routed and delivered to the application program 302 by the router 312. Processing of the response message by the message routing system 300 can occur in a similar fashion as discussed for the request message. In particular, the alert unit 310 can monitor the occurrence of events during processing of the response message in a similar fashion as discussed for the request message.

In some instances, the alert unit 310 can detect events in a session that involves application programs in addition to the application programs 302 and 304, and the alert unit 310 can send an alert message to one or more of the application programs participating in the session. It is contemplated that the alert unit 310 can include configurable permissions that specify whether a first application program (e.g., the application program 302) can receive alert messages for events involving a second application program (e.g., the application program 304), and vice versa. It is further contemplated that the alert unit 310 can include configurable permissions that specify whether any application program participating in a session can receive alert messages for events involving any other application program participating in the session.

Figure 4:
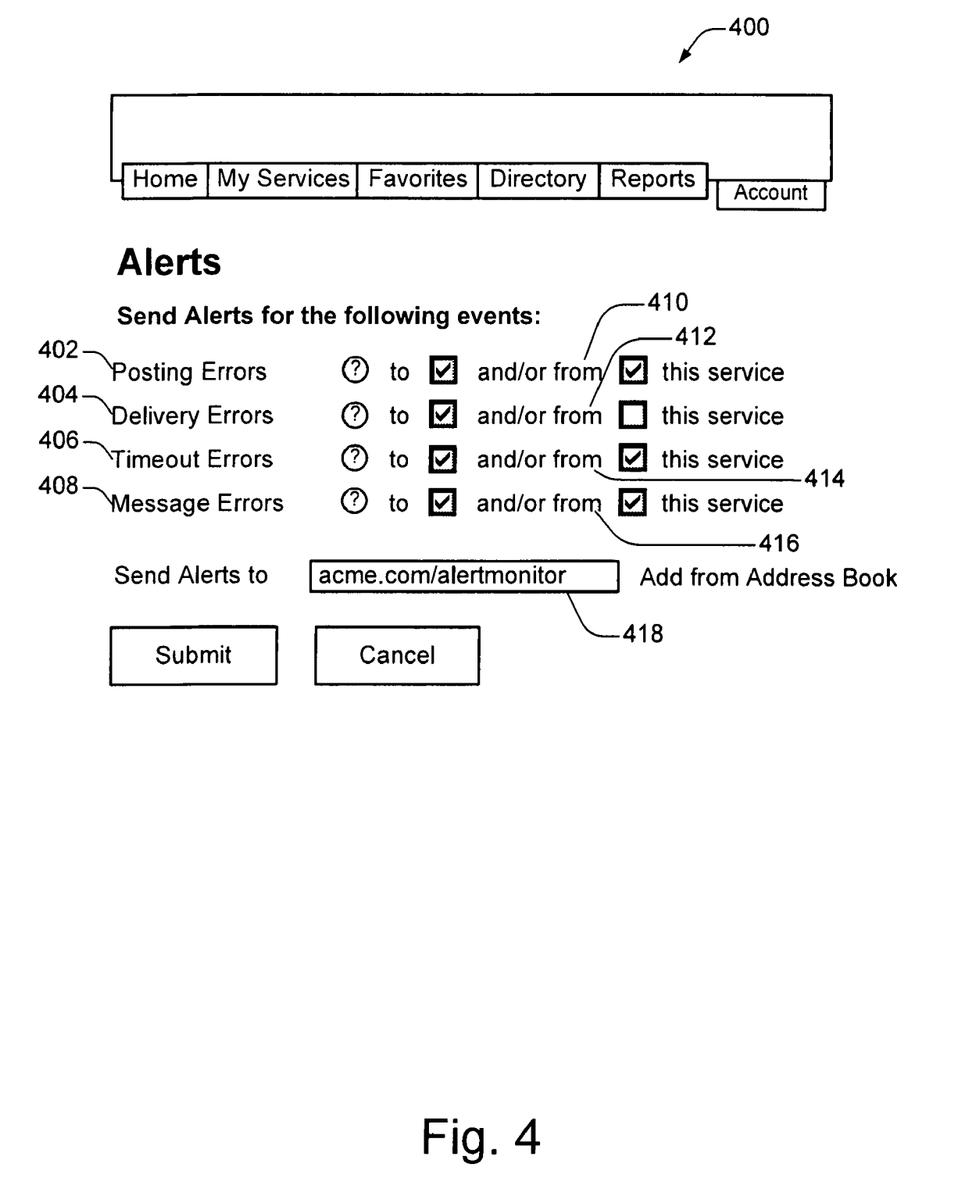
FIG. 4 illustrates a user-interface screen that can be provided by an alert unit for subscribing to alert messages, according to an embodiment of the invention.

FIG. 4 illustrates a user-interface screen 400 that can be provided by an alert unit (e.g., the alert unit 310) for subscribing to alert messages, according to an embodiment of the invention. The user-interface screen 400 can be used to subscribe an application program to receive alert messages. In particular, the user-interface screen 400 can be used to specify one or more event categories for which alert messages should be sent. As illustrated in FIG. 4, the user-interface screen 400 indicates a number of event categories 402, 404, 406, and 408, which are labeled as "posting errors," "delivery errors," "timeout errors," and "message errors," respectively. The event categories 402, 404, 406, and 408 are provided with user-interface elements 410, 412, 414, and 416, respectively. Each user-interface element can be used to specify whether alert messages should be sent for detected events of a particular event category in which the subscribed application program acts as a message sender, a message recipient, or either a message sender or a message recipient.

As illustrated in FIG. 4, the user-interface screen 400 also provides a user-interface element 418. The user-interface element 418 can be used to specify an application program that should receive alert messages. The application program that should receive alert messages can differ from the subscribed application program. For example, the application program that should receive alert messages can operate to monitor alert messages in which the subscribed application program acts as a message sender, a message recipient, or either a message sender or a message recipient.

It should be recognized that the specific embodiments of the invention discussed above are provided by way of example, and various other embodiments are encompassed by the invention.

An embodiment of the invention includes message interfaces (e.g., the message interfaces 306 and 308) that can use any of a variety of communication protocols for posting and delivery of messages, including, for example, Simple Object Access Protocol ("SOAP"), HyperText Transfer Protocol ("HTTP"), File Transfer Protocol ("FTP"), and Simple Mail Transfer Protocol ("SMTP").

An alert message according to an embodiment of the invention can be a SOAP message. An alert message can also be implemented using other message formats, including, for example, plain text. Delivery of an alert message can be performed using message interfaces (e.g., the message interfaces 306 and 308), according to an embodiment of the invention.

An embodiment of the invention can store information associated with various detected events in a searchable format to facilitate troubleshooting and reporting. For example, an embodiment of the invention can record detected events, event categories associated with the detected events, message recipients and message senders involved in the detected events, times associated with the detected events, and correlation information associated with the detected events, such as, for example, messaging and session identifiers of messages that triggered the detected events.

An embodiment of the invention can include a help system, including a wizard that provides assistance to users for configuring a computer (e.g., the computer 102, 104, or 106) and its various components.

An embodiment of the invention relates to a computer storage product with a computer-readable medium having computer instructions or code thereon for performing various computer-implemented operations. The media and computer code may be those specially designed and constructed for the purposes of the invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; carrier wave signals; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Additional examples of computer code include encrypted code and compressed code.

Another embodiment of the invention can be implemented using computer code in place of, or in combination with, hardwired circuitry. Referring to FIG. 1, the message exchange network 108 can be implemented in any number of ways. For example, the message exchange network 108 can be implemented in a centralized fashion as one or more server computers storing computer code to implement the message routing system 134, the data repository 138, and the billing system 140. The message exchange network 108 can also be implemented as a set of computer programs distributed across various computers (e.g., the computers 102, 104, and 106).

A practitioner of ordinary skill in the art should require no additional explanation in developing the apparatus and methods discussed herein but may nevertheless find some helpful guidance by examining U.S. patent application Ser. No. 09/820,964, filed on Mar. 30, 2001 and entitled "System and Method for Mapping of Services," U.S. patent application Ser. No. 09/820,965, filed on Mar. 30, 2001 and entitled "System and Method for Invocation of Services," and U.S. patent application Ser. No. 09/820,966, filed on Mar. 30, 2001 and entitled "System and Method for Routing Messages Between Applications," the disclosures of which are incorporated herein by reference in their entireties.

While the invention has been described with reference to the specific embodiments thereof, it should be understood by those skilled in the art that various changes may be made and equivalents may be substituted without departing from the true spirit and scope of the invention as defined by the appended claims. In addition, many modifications may be made to adapt a particular situation, material, composition of matter, method, process step or steps, to the objective, spirit and scope of the present invention. All such modifications are intended to be within the scope of the claims appended hereto. In particular, while the methods disclosed herein have been described with reference to particular steps performed in a particular order, it will be understood that these steps may be combined, sub-divided, or re-ordered to form an equivalent method without departing from the teachings of the invention. Accordingly, unless specifically indicated herein, the order and grouping of the steps is not a limitation of the invention.

What is claimed is:

1. A computer-readable storage medium having a code stored thereon, the code executable by a processor to perform a computer-implemented method of operating a message exchange network, the computer-implemented method comprising:

facilitating messaging among a plurality of services, said messaging involving a plurality of event categories, each event category of said plurality of event categories being associated with a different one of a plurality of stages of messaging, said stages of said messaging including posting of a message from a sending one of the services directed to a receiving one of the services, routing of the message to the receiving service, delivery of the message to the receiving service, and response to the message by the receiving service;

detecting an error condition during messaging between a message sender and a message recipient involving a first message from the message sender directed to the message recipient;

associating said error condition with an identified one of said stages of said messaging;

generating an alert message indicating said error condition and said identified stage of said messaging; and transmitting said alert message to said message recipient.

2. The computer-readable storage medium of claim 1, wherein said messaging occurs via a public network.

3. The computer-readable storage medium of claim 1, wherein detecting said error condition includes:

detecting said error condition in connection with processing of said first message generated by said message sender.

4. The computer-readable storage medium of claim 1, wherein transmitting said alert message includes:

transmitting said alert message to said message recipient even when said first message generated by said message sender is not delivered to said message recipient.

5. The computer-readable storage medium of claim 1, wherein transmitting said alert message includes:

transmitting said alert message to said message recipient via a public network.

6. A computer-readable storage medium having a code stored thereon, the code executable by a processor to perform a computer-implemented method of operating a message exchange network, the computer-implemented method comprising:

facilitating messaging among a plurality of services, said messaging involving a plurality of event categories, each event category of said plurality of event categories being associated with a different one of a plurality of stages of messaging, said stages of said messaging including posting of a message from a sending one of the services directed to a receiving one of the services, routing of the message to the receiving service, delivery of the message to the receiving service, and response to the message by the receiving service;

detecting a first event during said messaging between a message sender and a message recipient;

associating said first event with afirst one of said plurality of event categories, said first event category associated with an identified one of said stages of said messaging;

generating a first alert message indicating said first event and said first event category; and transmitting said first alert message to said message recipient.

7. The computer-readable storage medium of claim 6, wherein said messaging occurs via a public network.

8. The computer-readable storage medium of claim 6, the computer-implemented method further comprising:

transmitting said first alert message to said message sender.

9. The computer-readable storage medium of claim 8, wherein transmitting said first alert message includes:

transmitting said first alert message to said at least one of said message sender and said message recipient via a public network.

10. The computer-readable storage medium of claim 6, the computer-implemented method further comprising:

transmitting said first alert message to said monitoring application program via a public network.

11. The computer-readable storage medium of claim 10, wherein transmitting said first alert message includes:

transmitting said first alert message to said monitoring application program via a public network.

12. The computer-readable storage medium of claim 6, the computer-implemented method further comprising:

detecting a second event during said messaging; and associating said second event with said first event category.

13. The computer-readable storage medium of claim 12, wherein said first event and said second correspond to different error conditions during said messaging.

14. The computer-readable storage medium of claim 12, wherein generating said first alert message includes:

generating said first alert message indicating said first event, said second event, and said first event category.

15. The computer-readable storage medium of claim 12, further comprising:

generating a second alert message indicating said second event and said first event category.

16. The computer-readable storage medium of claim 6, wherein said plurality of event categories includes a second event category, the computer-implemented method further comprising:

detecting a second event during said messaging; and associating said second event with said first event category.

17. The computer-readable storage medium of claim 16, wherein said first event corresponds to a first error condition, and said second event corresponds to a second error condition.

18. The computer-readable storage medium of claim 16, wherein generating said first alert message includes:

generating said first alert message indicating said fiirst event, said second event, said first event category, and said second event category.

19. The computer-readable storage medium of claim 16, further comprising:

generating a second alert message indicating said second event and said second event category.

20. A computer-implemented method of operating a message exchange network, comprising:

facilitating messaging among a plurality of services using a plurality of computing devices in the message exchange network configured to facilitate said messaging, said messaging involving a plurality of event categories, each event category of said plurality of event categories being associated with a different one of a plurality of stages of messaging, said stages of said messaging including posting of a message from a sending one of the services directed to a receiving one of the services, routing of the message to the receiving service, delivery of the message to the receiving service, and response to the message by the receiving service;

associating a first message generated by a message sender with a message recipient;

detecting an event associated with said first message;

associating said event with a first one of said plurality of event categories, said first event category associated with an identified one of said stages of said messaging;

generating an alert message in response to detecting said event, said alert message indicating said event and said first event category; and transmitting said alert message to said message recipient.

21. The method of claim 20, wherein said event corresponds to one of a posting error, a routing error, a delivery error, a timeout error, and a message error.

22. The method of claim 20, further comprising:

associating said event with a stage of processing of said first message.

23. The method of claim 22, wherein generating said alert message includes:
generating an alert message indicating said event and said stage of processing said first message.

24. The method of claim 20, wherein transmitting said alert message includes:
transmitting said alert message to said message recipient even when said first message generated by said message sender is not delivered to said message recipient.

25. A computer-implemented method of operating a message exchange network, comprising:
providing a plurality of stages of messaging between a plurality of message senders and a plurality of message recipients using a plurality of computing devices in the message exchange network configured to facilitate said messaging, said stages of said messaging including posting of a message from one of the message senders directed to one of the message recipients, routing of the message to the one of the message recipients, and response to the message by the one of the message recipients;
detecting an event during a messaging session between a first message sender and a first message recipient involving a first message from the first message sender directed to the first message recipient;
associating said event with an identified one of said stages of said messaging;
generating an alert message indicating said event and said identified stage of said messaging; and
transmitting said alert message to said first message recipient.

26. The method of claim 25, wherein detecting said event includes:
detecting said event during said messaging session between said first message sender and said first message recipient.

27. The method of claim 26, wherein transmitting said alert message includes:
transmitting said alert message to an application program even when said application program does not participate in said messaging session between said first message sender and said first message recipient.

28. A computer-implemented method of operating a message exhange network, comprising:
associating messages generated by message senders with message recipients using a plurality of computing devices in the message exchange network configured to facilitate messaging among the message senders and the message recipients;
receiving said messages posted by said message senders at said message exchange network, said posting involving a first stage of messaging;
routing said messages to said message recipients, said routing involving a second stage of messaging;
delivering said messages to said message recipients, said delivering involving a third stage of messaging;
receiving responses generated by said message recipients, said receiving of said responses involving a fourth stage of messaging;
detecting an event associated with a first message in the message exchange network from a first message sender directed to a first message recipient;
associating said event with an event category, said event category associated with an identified one of said stages of said messaging;
generating an alert message in response to detecting said event, said alert message indicating said event and said event category; and
transmitting said alert message to said first message recipient.

* * * * *

UNITED STATES PATENT AND TRADEMARK OFFICE
CERTIFICATE OF CORRECTION

PATENT NO.         : 7,590,701 B2                                      Page 1 of 1
APPLICATION NO.    : 10/618089
DATED              : September 15, 2009
INVENTOR(S)        : Panec et al.

It is certified that error appears in the above-identified patent and that said Letters Patent is hereby corrected as shown below:

In line 1 of claim 1 (column 8, line 53) before "code stored" delete "a".

In line 1 of claim 6 (column 9, line 26) before "code stored" delete "a".

In line 18 of claim 6 (column 9, line 43) change "afirst" to --a first--.

In line 3 of claim 18 (column 10, line 29) change "fiirst" to --first--.

In line 3 of claim 23 (column 11, line 3) change "an" to --said--.

Signed and Sealed this

First Day of December, 2009

David J. Kappos
*Director of the United States Patent and Trademark Office*

UNITED STATES PATENT AND TRADEMARK OFFICE
CERTIFICATE OF CORRECTION

PATENT NO. : 7,590,701 B2
APPLICATION NO. : 10/618089
DATED : September 15, 2009
INVENTOR(S) : Panec et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1099 days.

Signed and Sealed this

Twenty-first Day of September, 2010

David J. Kappos
*Director of the United States Patent and Trademark Office*